No. 842,119.  
PATENTED JAN. 22, 1907.
H. C. SCOTT.  
WEED CUTTER.  
APPLICATION FILED MAY 7, 1904.
3 SHEETS—SHEET 1.
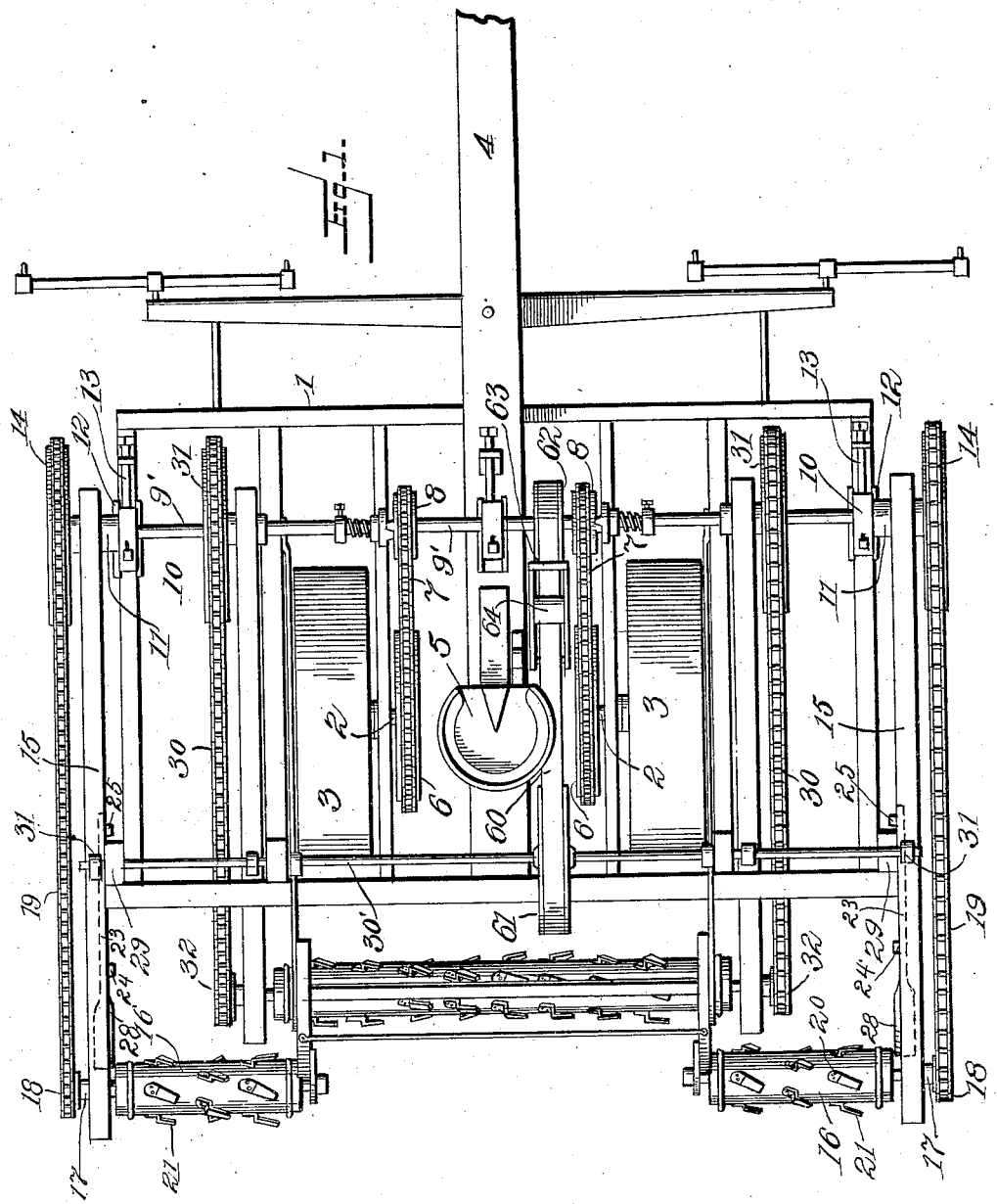
WITNESSES:
INVENTOR No. 842,119. PATENTED JAN. 22, 1907.
H. C. SCOTT.
WEED CUTTER.
APPLICATION FILED MAY 7, 1904.
3 SHEETS—SHEET 2.
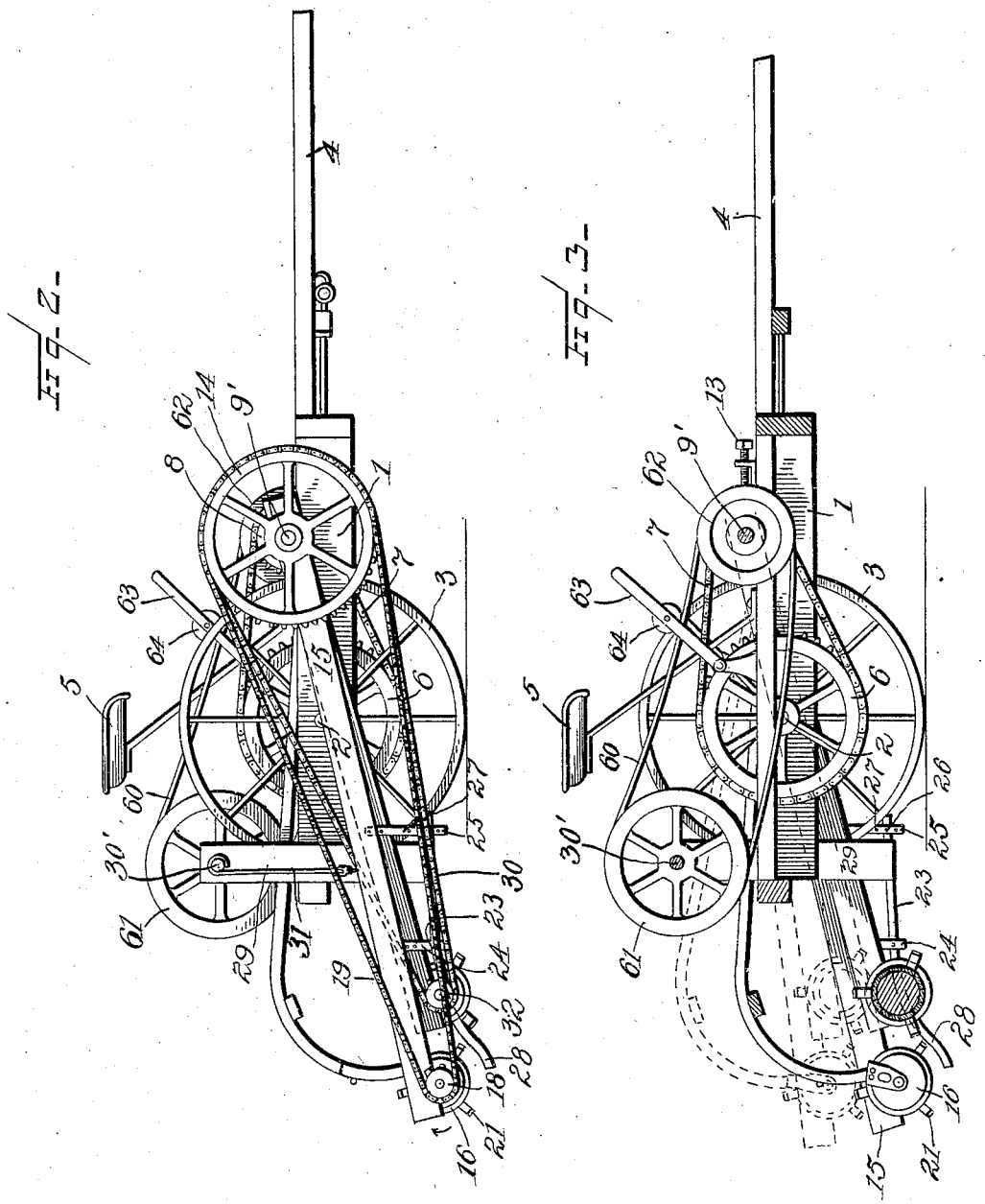

No. 842,119.
PATENTED JAN. 22, 1907.
H. C. SCOTT.
WEED CUTTER.
APPLICATION FILED MAY 7, 1904.
3 SHEETS—SHEET 3.
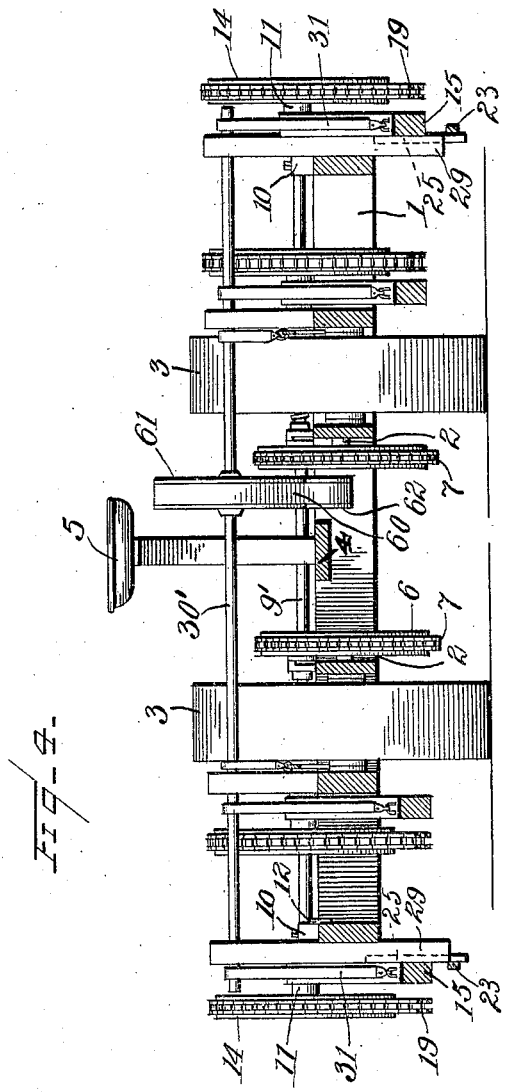
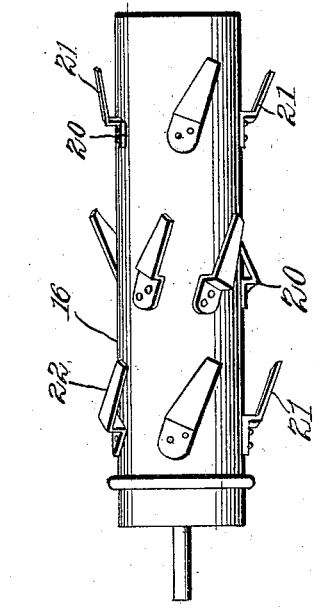
WITNESSES:
INVENTOR

UNITED STATES PATENT OFFICE.

HERMON C. SCOTT, OF RITZVILLE, WASHINGTON, ASSIGNOR OF ONE-HALF TO W. W. ZENT, OF RITZVILLE, WASHINGTON.

WEED-CUTTER.

No. 842,119.      Specification of Letters Patent.      Patented Jan. 22, 1907.

Application filed May 7, 1904. Serial No. 206,866.

*To all whom it may concern:*

Be it known that I, HERMON C. SCOTT, a citizen of the United States, residing at Ritzville, in the county of Adams and State of Washington, have invented a new and useful Improvement in Weed-Cutters, of which the following is a specification.

This invention relates to improvements in weed-cutters.

The object of the invention is to provide an efficient machine for destroying weeds and other objectionable growths in fallow or plowed land by cutting them out of the ground and leaving them exposed on the surface.

The invention consists in the novel construction and arrangement of parts hereinafter described and shown, and particularly pointed out in the claims hereto appended.

In the drawings, Figure 1 is a top plan view of a machine constructed in accordance with this invention. Fig. 2 is a side elevation of the same. Fig. 3 is a longitudinal section of the same. Fig. 4 is a transverse section of the same. Fig. 5 is a detail of one of the rollers.

Like numerals of reference designate corresponding parts in all the figures of the drawings.

1 designates a rectangular machine-frame, at opposite sides of which are journaled independent stub-axles 2, to which are keyed ground-wheels 3, that support the frame for travel and at the same time provide for transmitting motion to the working parts of the machine.

The wheeled machine-frame 1 is drawn by a team in the ordinary manner through a draft-tongue 4, extending transversely of the frame 1, and on which is mounted a seat 5 for the driver.

To the inner ends of the independent stub-axles 2 are keyed large sprocket-wheels 6, connected by sprocket-chains 7 to smaller sprocket-wheels 8, adapted to rotate loosely around a shaft 9', but normally clutched thereto to transmit motion to the same.

The shaft 9' is mounted at the front of the frame 1 in journal-boxes 10, which are formed with sleeves 11, that project laterally from opposite sides of the frame. The journal-boxes 10 are capable of horizontal longitudinal adjustment in ways 12 in the frame by screws 13 in order to tighten the sprocket chains should they become loose. To the outer ends of shaft 9', which extends transversely of the frame through and beyond the journal-boxes 10 and sleeves 11, are keyed sprocket-wheels 14. 15 designates a pair of bars loosely mounted at their front ends at opposite sides of the frame on the sleeves 11 and extending rearwardly and inclined to the opposite sides of the frame to pivotally connect to the frame a roller 16, resting on the ground in the rear of the frame.

The roller 16, which is normally held in contact with the surface of the ground by its own weight, is adapted to rotate in the direction of the arrow seen in Fig. 2 of the drawings at a comparatively high speed and to this end is provided with journals 17, mounted in the rear ends of bars 15. The outer ends of the journals 17 project laterally beyond their bearings in the bars 15 and are provided with small sprocket-wheels 18, keyed thereon and connected with the large sprockets 14 by sprocket-chains 19. When the machine is drawn over the ground, a rotary motion is transmitted through the independent stub-axles 2, sprocket-wheels 6, sprocket-chains 7, and sprocket-wheels 8 to shaft 9' and from thence to the roller 16 by sprocket-wheels 14 sprocket-chains 15, and sprocket-wheels 18.

In the preferred embodiment of my invention illustrated in the accompanying drawings the roller 16 is formed of a central and two end sections. The central section is journaled in advance of the end sections and is driven by independent gearing interposed between opposite ends of the same and the shaft 9'. As shown herein, this gearing consists of sprocket-chains 30, running over sprocket-wheels 31 and 32, secured on the shaft 9' and the axle of the central section, respectively.

Secured in separated rows longitudinally of the roller are a plurality of knives provided with shank portions 20 for supporting outwardly-inclined portions 21, having cutting edges 22. The portions 21 of the knives are outwardly inclined with relation to the axis of the roller, so that the weeds will readily slip out of engagement with the knives after the cutting operation and not become entangled about the roller. As the machine advances the knives enter the soft fallow ground, cut the weeds at their roots, and lift them to the surface at the back of the roller, where they slip from engagement with the knives and lie exposed to the atmosphere.

23 designates a pair of levers pivoted to brackets 24, secured to bars 15. The front ends of the levers 23 are detachably secured by bolts 26 to arms 25, depending from the bars 15, and the depending arms 25 are provided with a series of bolt-holes 27, so that the front ends of the levers 23 can be fastened at different points on the arms 25 by shifting the bolts 26. The rear ends of the levers 23 carry shoes 28, having broad curved bearing-surfaces that slide over the ground at the rear and at opposite sides of the roller to prevent the same from sinking too far into the soft ground. By adjusting the front ends of the levers 23 the shoes 28 can be raised or lowered to regulate the position of the roller and knives with relation to the ground.

Journaled in standards 29, that are secured to the frame 1 at the rear and at opposite sides thereof and which form guides for the bars 15, is a transverse shaft 30′, the ends of which project beyond the sides of the frame. Near the ends of the shaft 30′ are secured chains or ropes 31, which connect with the rear end of bars 15.

Pivoted to the frame near the seat 5 is a small U-shaped frame 63, in which is journaled an idler 64, normally resting against a belt 60, running over a flanged pulley 61, keyed to shaft 30′, and a flanged pulley 62, fast to shaft 9′. Normally the belt 60 is slack and will not transmit motion to the pulley 61; but if it is desired to elevate the roller 16 in order to clear rocks or other obstructions in its path the driver presses with his foot upon the free end of the pivoted U-shaped frame 63, forcing the idler 64 downwardly and tightening the belt. Motion will then be transmitted to the shaft 30′, which will wind up the chains 31, and thus lift the bars 15 and the roller.

Upon removing the pressure upon the small U-shaped frame 63, the belt 60 becoming slack will cease to transmit motion to the shaft 30′, and the roller by its weight will unwind the chain 31 and gradually descend to the ground.

The construction and operation of my invention will be readily understood upon reference to the foregoing description and accompanying drawings, and it will be appreciated that the parts and combinations recited may be varied within a wide range without departing from the spirit and scope thereof.

Having thus described my invention, what is claimed as new, and desired to be secured by Letters Patent, is—

1. In a weeding-machine, the combination of vertically-swinging frame members and a plurality of roller-sections carried by the swinging ends of such members, each of said roller-sections carrying offset knife members, and the central roller-section being arranged in advance of the others.

2. In a weeding-machine, the combination of vertically-swinging frame members, a pair of transversely-opposite roller-sections carried by certain frame members at opposite sides of the machine, and a central roller-section carried by other frame members and arranged in advance of the side roller-sections, all of said roller-sections carrying offset cutting-knives.

3. In a weeding-machine, a frame, a driven shaft journaled in the frame, a plurality of frame members pivotally swung on said driven shaft, and a plurality of roller-sections carried by said frame members and geared with said shaft, one of said roller-sections being arranged in advance of the others, and all of the roller-sections carrying cutting-knives.

4. In a weeding-machine, a frame, a driven shaft journaled transversely in the frame, a plurality of vertically-swinging frame members pivotally hung on said shaft, means for raising and lowering the frame members, transversely-opposite side roller-sections journaled in the frame members and carrying cutting-knives, and a central roller-section likewise carrying cutting-knives but arranged in advance of the side roller-sections.

In testimony whereof I have signed my name to this specification in the presence of two subscribing witnesses.

HERMON C. SCOTT.

Witnesses:
W. W. ZENT,
G. E. LOVELL.